G. KEELING.
AUTOMOBILE SIGNALING DEVICE.
APPLICATION FILED JAN. 23, 1920.
1,358,316.
Patented Nov. 9, 1920.
2 SHEETS—SHEET 2.
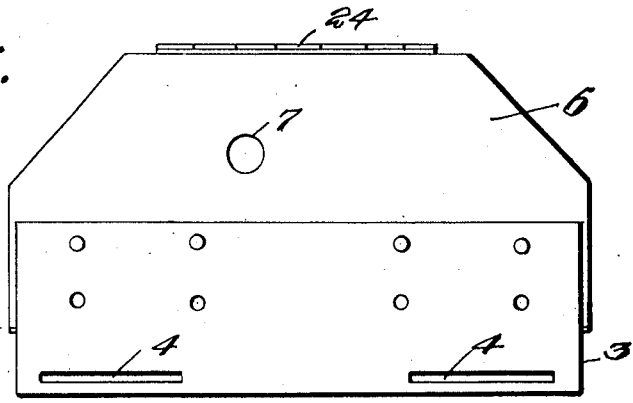
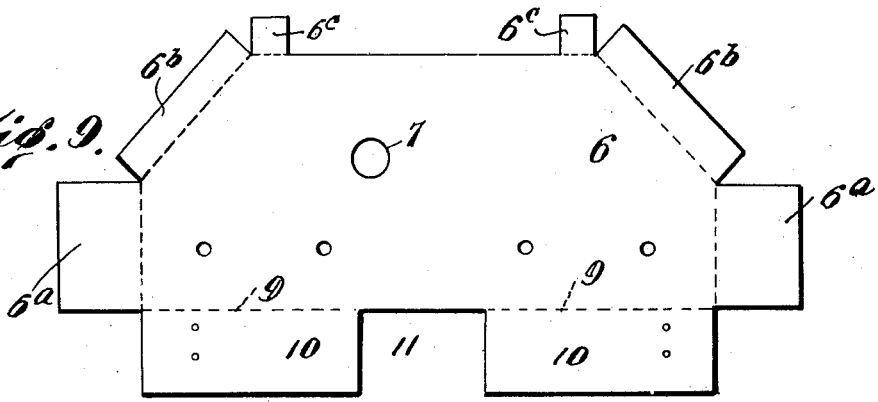
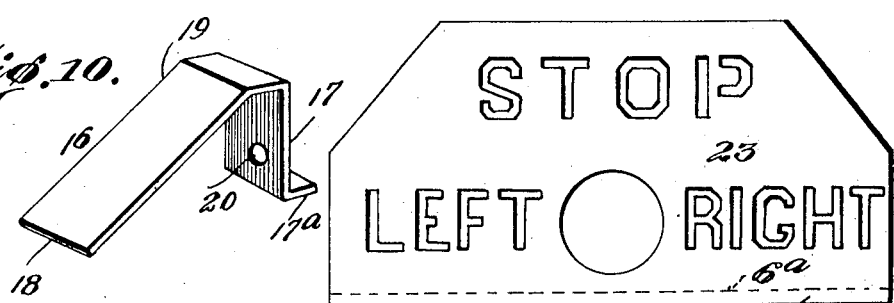
Inventor
George Keeling.

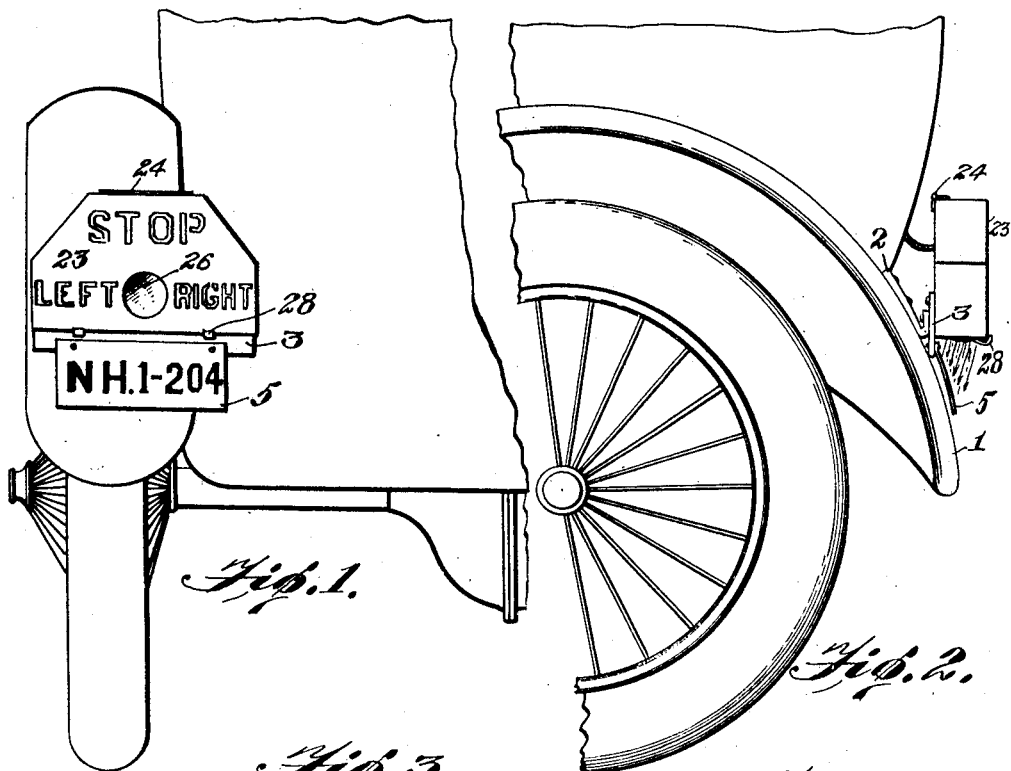
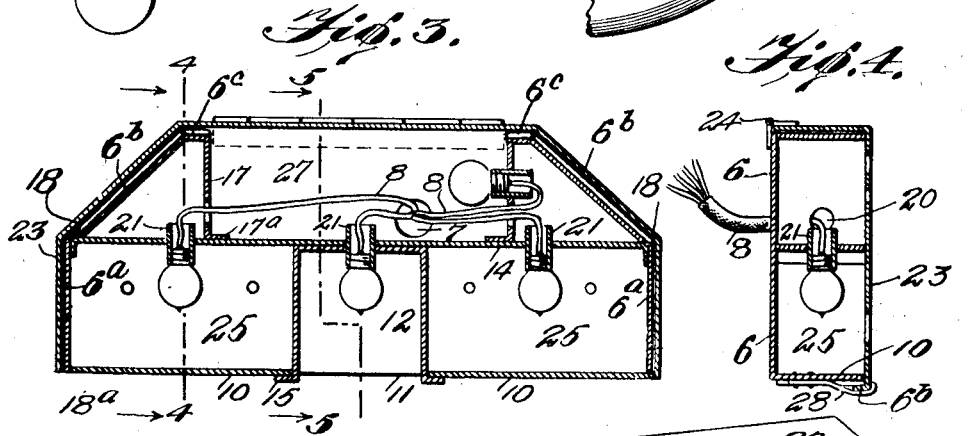
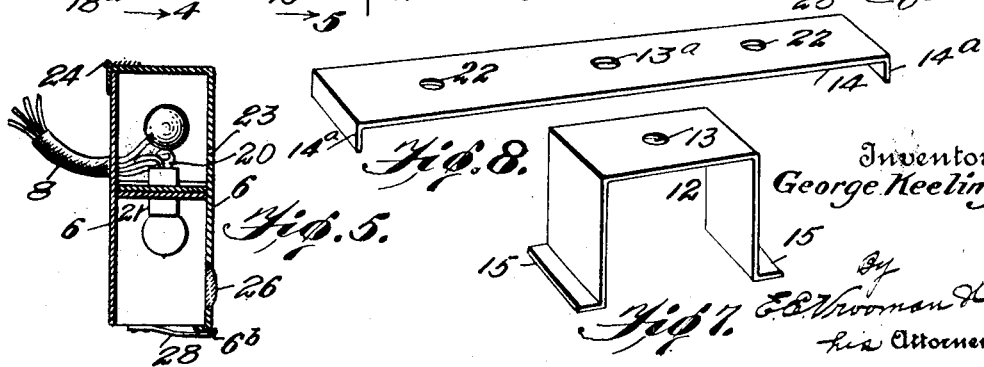

UNITED STATES PATENT OFFICE.

GEORGE KEELING, OF NEW HAVEN, CONNECTICUT.

AUTOMOBILE SIGNALING DEVICE.

1,358,316.     Specification of Letters Patent.     Patented Nov. 9, 1920.

Application filed January 23, 1920. Serial No. 353,399.

*To all whom it may concern:*

Be it known that I, GEORGE KEELING, a citizen of the United States, residing at New Haven, in the county of New Haven and State of Connecticut, have invented certain new and useful Improvements in Automobile Signaling Devices, of which the following is a specification, reference being had therein to the accompanying drawings.

This invention relates to an automobile signaling device, and more particularly to the construction of a casing that efficiently retains the lights, or lamps, so as to easily expose signs, or signals, of the device.

The object of the invention is the construction of a device, which will easily and efficiently expose words or signals and at the same time will illuminate the license tag, or tags.

With this and other objects in view, my invention comprises certain novel combinations, arrangements, and constructions, as will be hereinafter fully described, illustrated in the accompanying drawings, and more particularly pointed out in the appended claims.

In the drawings:

Figure 1 is a view in front elevation of the device, showing the same as it appears attached to the rear mud guard of a motor vehicle, while Fig. 2 is an end view in elevation of the same.

Fig. 3 is a longitudinal vertical sectional view of the device.

Fig. 4 is a section taken on line 4—4, Fig. 3, looking in the direction of the arrows.

Fig. 5 is a sectional view taken on line 5—5, Fig. 3, and looking in the direction of the arrows.

Fig. 6 is a back or rear view of the device.

Fig. 7 is a perspective view of the central U-shaped divisional member.

Fig. 8 is a perspective view of the horizontal divisional member.

Fig. 9 is a view of the blank, forming a back member and part of the side and bottom portions of the device.

Fig. 10 is a perspective view of one of the end members.

Fig. 11 is a plan view of the front member prior to folding.

Referring to the drawings by numerals, 1 designates a mud guard of a motor vehicle, to which is secured a bracket 2, and the bracket 2 is attached to the back plate 3.

The back plate 3 is provided with elongated slots 4, near its lower edge, by means of which the license tag 5 may be attached; the ordinary bolts or rivets can be passed through the tag 5, upon the back plate 3.

The back plate 3 is fastened to the back plate 6 of the casing, and this back plate is provided with an aperture 7, through which the feed wires 8 are passed or threaded and thence are connected to the lamps; these wires 8 are electrically connected to the battery or generator of the vehicle upon which the device is supported.

The back plate 6 is folded along the line 9, Fig. 9, and is provided with two bottom portions 10; the bottom portions 10 are separated by an open portion 11.

A central U-shaped divisional member 12 is employed, which member is provided with a lamp-receiving aperture 13 in its body registering with a similarly constructed aperture $13^a$ formed in the horizontal divisional member 14; this member 14 is provided with downwardly-extending flanges $14^a$, engaging the inner face of the end members hereinafter described. The inverted U-shaped divisional member 12 is provided with outwardly - extending horizontally-positioned feet 15, which feet 15 rest under the inner ends of the bottom portions 10, Fig. 3.

I provide a pair of end members 16, and each member includes (Figs. 3 and 10) a vertical inner end 17 which is provided with an inwardly-extending foot $17^a$. Integral with the upper end of each end 17 is an angular portion 19. The foot $17^a$ rests upon the top of the horizontal divisional member 14. The lower outer end 18 of angular portion 19 rests upon the divisional member 14, Fig. 3.

The back plate or member 6 is provided with integral end portions $6^a$, which are folded at right angles to the back (Fig. 3), constituting the outer end or side of each compartment 25. The back plate or member 6 is also provided with top portions $6^b$ and $6^c$. The top portions $6^b$ and $6^c$ are folded at right angles to the back plate or member 6. The portions 6ᵇ rest on the angular part of the member 16, and element 6ᶜ on the flat upper portion.

In the inner ends 17 of the end members 16 are apertures 20, through which the wires 8 can extend to the lamps that are supported upon the sleeves 21 positioned in the apertures 22 of the horizontal divisional member 14. Another sleeve 21 is positioned in the registering apertures 13 and 13ᵃ so that a lamp is supported within the central compartment constituted by the U-shaped divisional member 12, and this lamp casts its rays down upon the license tag, as its compartment in which it is positioned has an open bottom.

A hinged cover 23 is supported, at 24, upon the upper edge of the back plate 6 and closes over the top and front of the casing which is divided up into compartments by means of the end portions of the back member 6, the end members 16, the U-shaped inverted member 12 and the horizontal divisional member 14.

The cover is provided with any suitable words or warnings, and the compartments 25 at the ends of the device are behind the words "Left" and "Right," whereas, the central compartment, constituted by the U-shaped member 12, is behind the red glass 26—the danger signal—on the cover 23; besides the lamp in the compartment formed by the U-shaped member, illuminating the red glass 26, it will illuminate, as stated, the license tag 5.

The upper compartment 27 is provided for containing the lamp that illuminates the word "Stop" formed in any suitable manner on the cover 23.

The cover 23 is provided on its lower edge with an inwardly-extending flange 6ᵇ, which flange 6ᵇ extends under bottom portions 10. (Fig. 4.)

I provide a spring catch 28 for normally holding the cover 23 in a closed position upon the body of the casing.

It is to be understood from the foregoing description that I have provided a casing, including a peculiarly constructed central compartment that is directly behind the red light signal of the device, and which compartment is provided with an open bottom so that the light then can shed its rays upon the license tag; further, the device includes a casing comprising peculiarly constructed end members, a central U-shaped member and a horizontal divisional member, dividing the casing up into compartments, in each of which compartments is an electric lamp that sheds its rays through suitable signaling means formed upon the cover of the casing.

While I have described the preferred embodiment of my invention and have illustrated the same in the accompanying drawings, certain minor changes or alterations may appear to one skilled in the art to which this invention relates and I, therefore, reserve the right to make such alterations or changes as shall fairly fall within the spirit and scope of the appended claims.

What I claim is:

1. In a device of the class described, the combination of a back member provided with horizontal integral bottom portions separated by an open central portion, a central member engaging the inner ends of the bottom portions producing an open bottom compartment, end members engaging the back member, a horizontal divisional member engaging at its ends the end members, said back member, bottom portions, central member, end members and horizontal divisional member producing compartments, means in said compartments for illuminating the same, and a cover on said back member, and provided with means constituting a sign or signal in front of the compartments to be displayed by the illuminating means in said compartments.

2. In a device of the class described, the combination of a back provided with forwardly-extending bottom portions separated by a central open portion, end members provided with vertical inner ends, said vertical ends terminating at their lower ends in inwardly-extending feet, a horizontal divisional member having its ends positioned against the end members, said feet of the end members resting upon the horizontal divisional member, a U-shaped divisional member engaging the horizontal divisional member and provided with feet, said last-mentioned feet extending under the inner ends of the bottom portions, illuminating means supported upon one of said end members, horizontal member and U-shaped member, and a cover provided with means constituting a sign or signal which the illuminating means may illuminate.

3. In a device of the class described, the combination of a casing including angle end members, a horizontal divisional member engaging the end members, an inverted divisional member engaging the horizontal divisional member, said inverted divisional member constituting an open-bottom compartment, said end members, horizontal divisional member and inverted divisional member producing independent compartments in the casing, a cover upon the casing and closing the compartments except that produced by the inverted divisional member, said cover provided with indicating or signaling means registering with the compartment of the casing, and illuminating means in the compartments behind said indicating or signaling means.

4. In a device of the class described, the combination of a back member provided with integral forwardly-extending bottom portions separated by an open central portion, said back member also provided with integral top portions bent at right angles thereto, end members provided with vertical inner ends and with angular outer portions, the top portions of the back member resting upon the angular end portions of the end members, a horizontal divisional member engaging the ends of the angular portions of the end members, said horizontal member positioned against the inner face of the end portions of the back member, an inverted U-shaped member engaging the horizontal member and having its ends engaging the inner ends of the bottom portion, said end members, horizontal member and U-shaped member, together with the end portions of the back member producing compartments, a hinged cover attached to the back member and provided with indicating or signaling means in front of said compartments, and lamps in said compartments illuminating the indicating or signaling means of the cover.

5. In a device of the class described, the combination of a back member provided with integral bottom, end and top portions, a horizontal member engaging at its ends the upper end of the end portions of the back member, a central inverted member secured against the horizontal member to the inner ends of the bottom portions, angular end members resting upon the horizontal member and under the top portions of the body portions of the back member, said end members, horizontal member, inverted member and bottom and end portions of the back member constituting compartments, a cover provided with indicating or signaling means in front of and closing upon the front of said compartments, and illuminating means in said compartments behind the indicating or signaling means of the cover.

In testimony whereof I hereunto affix my signature.

GEORGE KEELING.